(12) United States Patent
Akins et al.

(10) Patent No.: US 6,167,842 B1
(45) Date of Patent: Jan. 2, 2001

(54) ANIMAL CONFINEMENT PEN WITH IMPROVED ACCESS TO ANIMAL

(75) Inventors: Allan Akins, P.O. Box 158, St. Boniface, Manitoba (CA), R2H 3B4; Joe Kuffner; Len Peters, both of St. Boniface (CA)

(73) Assignee: Allan Akins, Manitoba (CA)

( * ) Notice: Under 35 U.S.C. 154(b), the term of this patent shall be extended for 0 days.

(21) Appl. No.: 09/326,082

(22) Filed: Jun. 4, 1999

(30) Foreign Application Priority Data

Oct. 2, 1998 (CA) .................................................. 2249362

(51) Int. Cl.[7] .............................. A01K 1/00; A01K 15/04
(52) U.S. Cl. ........................... 119/502; 119/732; 119/510
(58) Field of Search .................................. 119/502, 510, 119/516, 522, 523, 729, 732, 738

(56) References Cited

U.S. PATENT DOCUMENTS

| | | | |
|---|---|---|---|
| 1,182,018 | * 5/1916 | Koenig | 119/510 |
| 3,550,559 | * 12/1970 | Long | 119/502 |
| 4,444,150 | * 4/1984 | Hueftle et al. | 119/516 |
| 5,129,362 | * 7/1992 | Ferrell | 119/502 |
| 5,138,981 | 8/1992 | Akins | 119/732 |
| 5,263,438 | * 11/1993 | Cummings | 119/732 |

* cited by examiner

Primary Examiner—Peter M. Poon
Assistant Examiner—Elizabeth Shaw
(74) Attorney, Agent, or Firm—Charles G. Lamb; Middleton Reutlinger

(57) ABSTRACT

The invention provides an animal confinement pen comprising a front panel, a rear panel comprising a rear gate, a first side panel comprising a fixed front side panel and a movable rear side panel, and a second side panel; means to confine an animal against the first side panel with the animal's head extending through a head gate incorporated in the front panel; means to lock the rear side panel into substantial alignment with the front side panel adjacent the confined animal and to release the rear side panel allowing same to move away from the rear portion of the confined animal; means to move the rear gate away from the rear end of the confined animal; whereby all parts of the pen may be moved away from the rear end and a rear portion of the confined animal thereby allowing access thereto by the pen operator. A two-way gate provides operational advantages similar to those found in prior art pens.

19 Claims, 8 Drawing Sheets

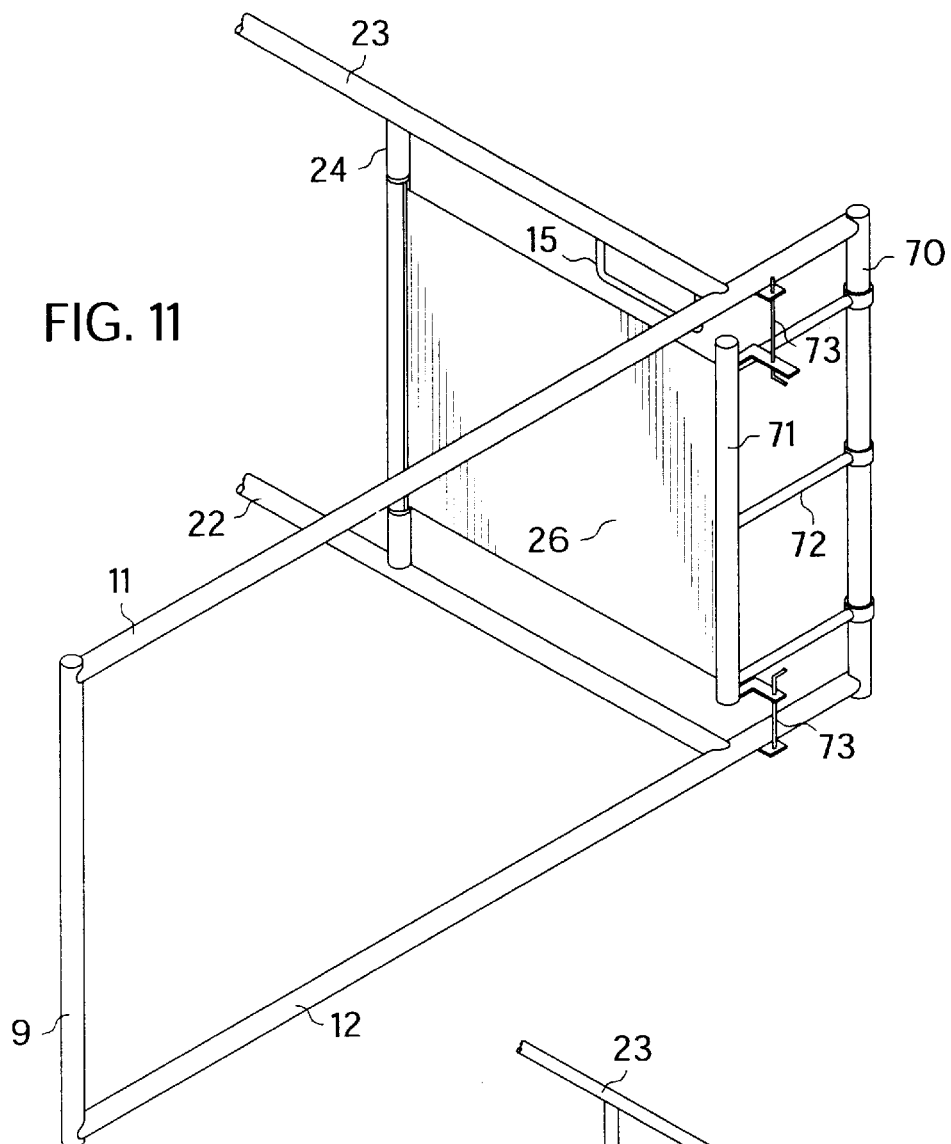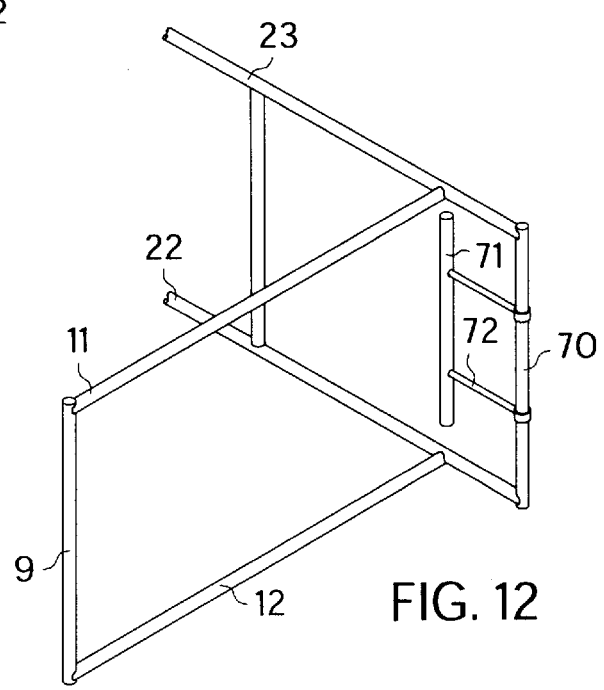

ANIMAL CONFINEMENT PEN WITH IMPROVED ACCESS TO ANIMAL

This invention is in the field of apparatus used for the confinement and management of livestock and more particularly deals with a pen for the containment of an animal.

Reference is made to my co-pending application Ser. No. 09/325,939 filed simultaneously with this application entitled "TWO-WAY GATE", which application describes a two-way gate which may be used with the present invention.

BACKGROUND

This invention deals with the field of pens for confining animals and in particular such a pen that provides improved access to a confined animal.

Animal confinement pens are used to confine livestock particularly for calving purposes, the pen incorporating means to confine the mother while the calf may wander within the pen. As well the mother may be released from the confinement means and still be contained within the pen to facilitate further observation. As well as for calving, such pens are useful for other livestock treatment and observation as well, such as vaccination, disease detection and so forth.

Such pens typically confine the cow against one side of a pen with a pivoting squeeze panel, with the cows neck confined in a head gate on that side of the front of the pen. An example of such a pen is disclosed in U.S. Pat. No. 5,138,981 to the present inventor Akins.

A problem with such pens is that access to the animal is restricted by the panels making up the pen. In such pens the squeeze panel is typically hinged to a midpoint of the front panel and it is preferred to have the rear entrance gate hinge on the same side of the pen as the animal is squeezed against. In this way the squeeze panel and gate may be aligned to guide the animal diagonally across the pen and into the head gate, at which time the squeeze panel is swung parallel to the side panel and locked into position, thereby confining the animal against the side panel. Once the animal is so confined, the rear gate may be opened, however the side panel and the upright whereon the rear gate is hinged are fixed in position and interfere with access to the side of the animal adjacent the side panel.

Particularly for calving, access to both sides of the rear portion of an animal would be advantageous.

SUMMARY OF THE INVENTION

It is an object of the present invention to provide an animal confinement pen which allows access to the rear end of a confined animal and to both sides of a rear portion of the animal.

It is a further object of the present invention to provide such a pen which allows the rear gate thereof to be used to direct an animal diagonally across the pen and into the head gate of the pen.

The invention accomplishes these objects providing in one aspect an animal confinement pen comprising a front panel, a rear panel comprising a rear gate, a first side panel comprising a fixed front side panel and a movable rear side panel, and a second side panel; means to confine an animal against said first side panel with the animal's head extending through a head gate incorporated in said front panel; means to lock said rear side panel into substantial alignment with said front side panel adjacent said confined animal and to release said rear side panel allowing same to move away from the rear portion of said confined animal; means to move said rear gate away from the rear end of said confined animal; whereby all parts of said pen may be moved away from said rear end and a rear portion of said confined animal thereby allowing access thereto by the pen operator.

The pen could comprise a first side panel frame, said first side panel frame comprising a front side vertical member attached to a first end of said front panel; a bottom side horizontal member attached to the bottom of said front side vertical member and extending to the rear of said pen; a top side horizontal member attached to the top of said front side vertical member and extending to the rear of said pen; and an intermediate side vertical member attached between said top and bottom side horizontal members at a mid point thereof; a front side panel attached between said front and intermediate side vertical members and between said top and bottom side horizontal members; a rear side panel movably mounted in said first side panel frame between said top and bottom side horizontal members such that said rear side panel may be moved from a closed position adjacent to said confined animal to an open position removed from said confined animal; a second side panel attached at the front end thereof to the second end of said front panel and extending substantially perpendicular thereto to the rear of said pen; a rear frame comprising a rear frame vertical member attached to the rear end of said second side panel; a bottom rear horizontal member attached at one end to the bottom of said rear frame vertical member and attached at the opposite end to the rear end of said bottom side horizontal member; a top rear horizontal member attached at one end to the top of said rear frame vertical member and attached at the opposite end to the rear end of said top side horizontal member; said rear gate movably mounted in said rear frame between said top and bottom rear horizontal members such that said gate may be moved from a closed position adjacent to the rear end of said confined animal to an open position removed therefrom; means to selectively secure said rear first side panel in said closed position and release same to move to said open position; and means to selectively secure said rear gate in said closed position and release same to move to said open position.

The pen thus does not have a vertical member at the rear corner adjacent to the rear of the confined animal. The first side panel frame and rear frame comprise top and bottom members which meet at this rear corner and are supported by the intermediate vertical member of the first side panel frame which is somewhat towards the front of the pen from this rear corner. The movable rear first side panel and the rear gate may be moved away from the confined animal, thus giving unrestricted access to the rear end and both sides of a rear portion thereof. The means to confine the animal against the first side panel need not extend all the way to the rear end of the animal, thus allowing access to a rear portion of that side of the animal.

The rear side panel could be pivotally attached at its front end about a vertical axis to the intermediate vertical member such that the rear side panel may pivot about the vertical axis from a closed position aligned with the first side panel frame to an open position removed from the confined animal. To provide improved versatility, the rear side panel could comprise an upper panel and a lower panel, each pivotally attached to the intermediate vertical member such that the panels may be selectively locked in alignment with the upper panel above the lower panel, or unlocked so that each may pivot independently.

Similarly, the rear gate could be pivotally attached about a vertical axis at its second end to the rear frame such that the rear gate may pivot from a closed position aligned with the rear frame to an open position.

To allow the gate to be used to help direct the animal diagonally across the pen to the head gate, the rear gate could further be a two-way gate wherein the gate is also pivotally attached about a vertical axis at its first end to the rear frame and latchable at its second end to the rear frame whereby either end of the gate may swing open.

The two-way rear gate could comprise a rear gate vertical member attached to the rear gate and extending substantially between the top and bottom rear horizontal members; a gate pivot pin extending from each end of the rear gate vertical member, the gate pivot pins biassed in an extended position and retractable against the biassing force to a retracted position wherein the gate pivot pins are retracted within the rear gate vertical member; a pivot hole defined by each of the top and bottom rear horizontal members for receiving the gate pivot pins; and means for retracting the gate pivot pins.

The pen could further comprise a pin guide at each pivot hole for guiding the pin into the hole, the pin guide comprising a slanted portion operable to push the gate pivot pins into a retracted position when the rear gate is pushed closed, the pin extending in response to the biasing force when aligned with the pivot hole. Thus the gate could latch automatically when pushed closed or slammed.

There could be such a rear gate vertical member at each end of the gate, or a different mechanism at one end. The advantage of the disclosed mechanism is that no vertical member is required, thereby providing the free access to the confined animal that is desired.

The means to selectively secure the rear side panel could comprise a rear vertical side member attached to the rear end of the rear side panel and extending substantially between the top and bottom side horizontal members and latchable to at least one of the top and bottom side and rear horizontal members.

Alternatively, the rear side panel could be slidingly attached to the first side panel frame such that the rear side panel may slide from a closed position, adjacent to the confined animal between the intermediate vertical member and the rear frame, to an open position adjacent to the front side panel and substantially between the intermediate vertical member and the front side vertical member. The means to selectively secure the rear side panel could comprise a latch engaging the rear side panel and one of the first side panel frame and the rear frame.

Similarly, the rear gate could comprise a fixed rear panel attached to the rear frame adjacent to the rear frame vertical member and a rear gate slidingly attached to the rear frame such that the rear gate may slide from a closed position, adjacent to the rear end of the confined animal, to an open position adjacent to the fixed rear panel.

This configuration would somewhat restrict access to the pen, as the gate would not be full width, however it may be suitable to some circumstances.

In a second aspect, the invention provides an animal confinement pen comprising a front panel having a first end and a second end and incorporating a head gate adjacent said first end thereof; a squeeze panel pivotally attached about a vertical axis to a mid-point of said front panel adjacent to said head gate such that said squeeze panel may be pivoted from a closed position, wherein said squeeze panel is substantially perpendicular to said front panel and acts in that position to confine an animal between said squeeze panel and a first side panel, to an open position removed from said animal; a first side panel frame comprising a front side vertical member attached to said first end of the front panel; a top side horizontal member attached at the front end thereof to the top of said front side vertical member and a bottom side horizontal member attached at the front end thereof to the bottom of said front side vertical member, said top and bottom side horizontal members extending to the rear of the pen, substantially perpendicular to said front panel; and an intermediate side vertical member attached at its top end to said top side horizontal member and at its bottom end to said bottom side horizontal member at a midpoint of said horizontal members; a front side panel attached to said first side panel frame between said front and intermediate side vertical members and between said top and bottom side horizontal members; a rear side panel pivotally attached about a vertical axis at its front end to said intermediate side vertical member such that said rear first side panel may pivot from a closed position in alignment with said first side panel frame and adjacent to an animal confined by said squeeze panel, to an open position removed therefrom; a second side panel attached to said second end of the front panel and extending towards the rear of said pen, substantially perpendicular to said front panel; a rear frame comprising a rear frame vertical member attached to the rear end of said second side panel; a top rear horizontal member attached at one end thereof to the top of said rear frame vertical member and a bottom rear horizontal member attached at one end thereof to the bottom of said rear frame vertical member, said top and bottom rear horizontal members extending substantially perpendicular to said second side panel and attached at the opposite ends thereof to the rear ends of said top and bottom first side horizontal members respectively to form a top rear corner and a bottom rear corner; a frame extension comprising a top frame extension member attached to said top rear corner and extending therefrom such that the outside end thereof is outside the pen; a bottom frame extension member attached to said bottom rear corner and extending therefrom such that the outside end thereof is substantially vertically below said outside end of the top frame extension member; a vertical extension member attached between said outside ends of the top and bottom frame extension members; a vertical corner member pivotally attached about a vertical axis to said vertical extension member such that said vertical corner member may pivot from a closed position, wherein said vertical corner member is aligned with said top and bottom rear corners, to an open position wherein said vertical corner member is removed from said corners; a first latch to selectively secure said rear side panel in said closed position or release same; a second latch to selectively secure said vertical corner member in said closed position or release same; a rear panel comprising a rear gate pivotally attached about a vertical axis at its second end, nearest said rear frame vertical member, to said rear frame and latchable at its first end to said vertical corner member.

In this manner, a vertical corner member is provided at the rear corner of the pen which may be swung out of the way. This vertical corner member and the vertical extension member provide a stronger and more rugged pen than is possible when there is only the intermediate vertical member to support the rear end of the first side panel frame as well as the rear frame.

The top and bottom extension members could extend in line with the rear frame or the first side panel frame and be made simply by extending the horizontal member of one or the other frame. In either case the vertical extension member will be removed from the rear of the confined animal and the vertical corner member will swing away as well, pivoting about the vertical extension member.

Again in order to allow the gate to be used to help direct the animal diagonally across the pen to the head gate, the rear gate could be a two-way gate pivotally attached about a vertical axis at its second end to the rear frame vertical member and latchable at its first end to the vertical corner member and, as well pivotally attached about a vertical axis at its first end to the vertical corner member and latchable at its second end to the rear frame vertical member whereby either end of the two-way gate may be opened. Pivoting and latching about the vertical members could more easily provide a stronger gate as well.

Various such two-way gates are known in the prior art and could be utilized.

The invention thus provides an animal confinement pen that has no rear corner vertical post adjacent to the rear end of the confined animal, providing instead a structure with horizontal top and bottom members that are supported on one side by a vertical member somewhat removed from the corner, and by a vertical member on the rear corner opposite the confined animal, this structure supporting the movable rear side panel and rear gate which may be moved away from the animal. Access to the rear end of the confined animal is thereby improved to facilitate calving aid and other livestock treatment.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 11 is a perspective view of a first alternate rear frame;

FIG. 12 is a perspective view of a second alternate rear frame;

DETAILED DESCRIPTION OF THE ILLUSTRATED EMBODIMENTS

Figure 1:
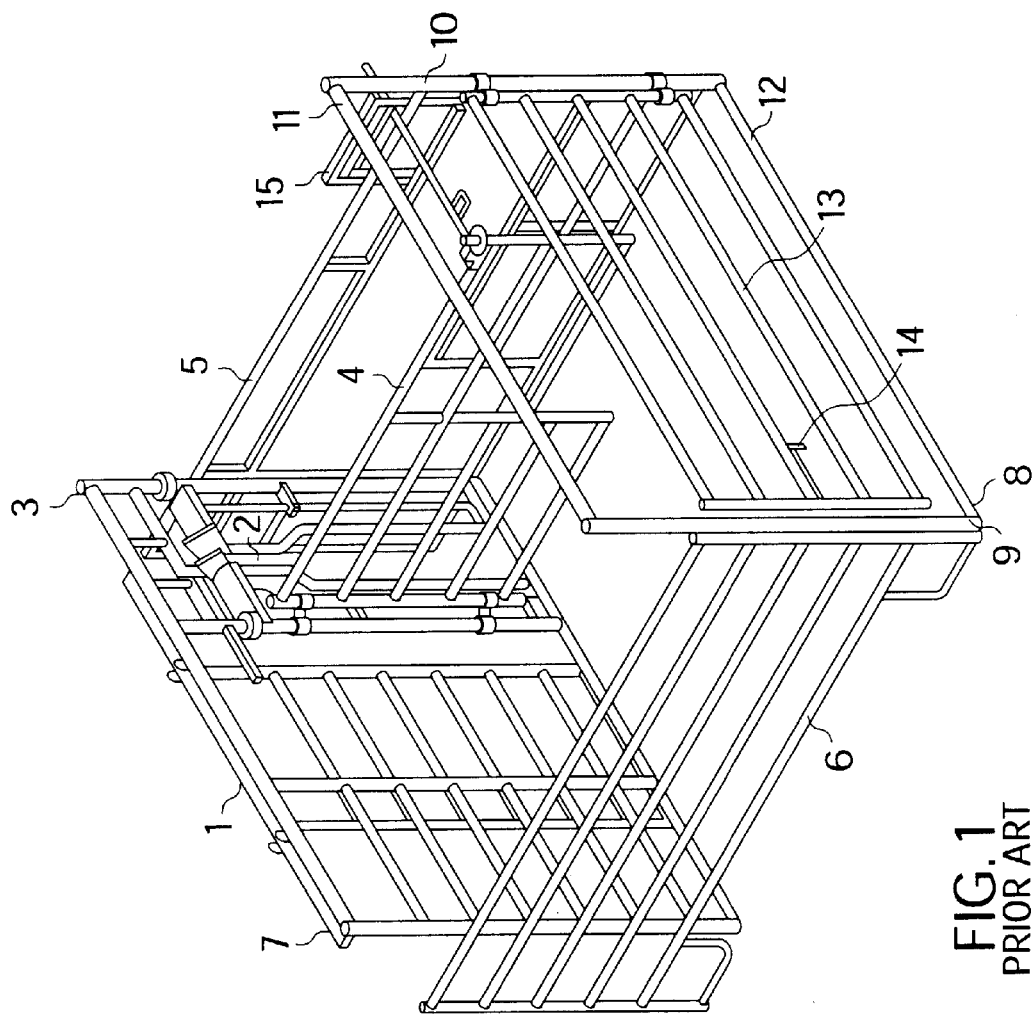
FIG. 1 is a perspective view of a prior art animal confinement pen.

FIG. 1 illustrates a prior art animal confinement pen comprising a front panel 1 with a head gate 2 incorporated therein adjacent a first end 3 of the front panel 1. A squeeze panel 4 is pivotally attached to a mid-point of the front panel 1 adjacent to the head gate 2 such that the squeeze panel 4 may be pivoted from a closed position as illustrated, wherein the squeeze panel 4 is substantially perpendicular to the front panel 1 and acts in that position to confine an animal between the squeeze panel 4 and a first side panel 5, to an open position removed from the animal.

A first side panel 5 is attached to the first end 3 of the front panel 1 and extends to the rear of the pen, substantially perpendicular to the front panel 1. A squeeze panel latch plate 15 is mounted on the first side panel 5. A second side panel 6 is attached to the second end 7 of the front panel 1 and extends to the rear of the pen, substantially perpendicular to the front panel 1. A rear frame 8 comprises a rear frame vertical member 9 attached to the rear end of the second side panel 6, a corner vertical member 10 attached to the rear end of the first side panel 5, and top and bottom rear horizontal members 11, 12. Rear gate 13 pivots about the vertical corner member 10 and is fastened in the closed position by lock pin 14 engaging rear frame vertical member 9.

Figure 2:
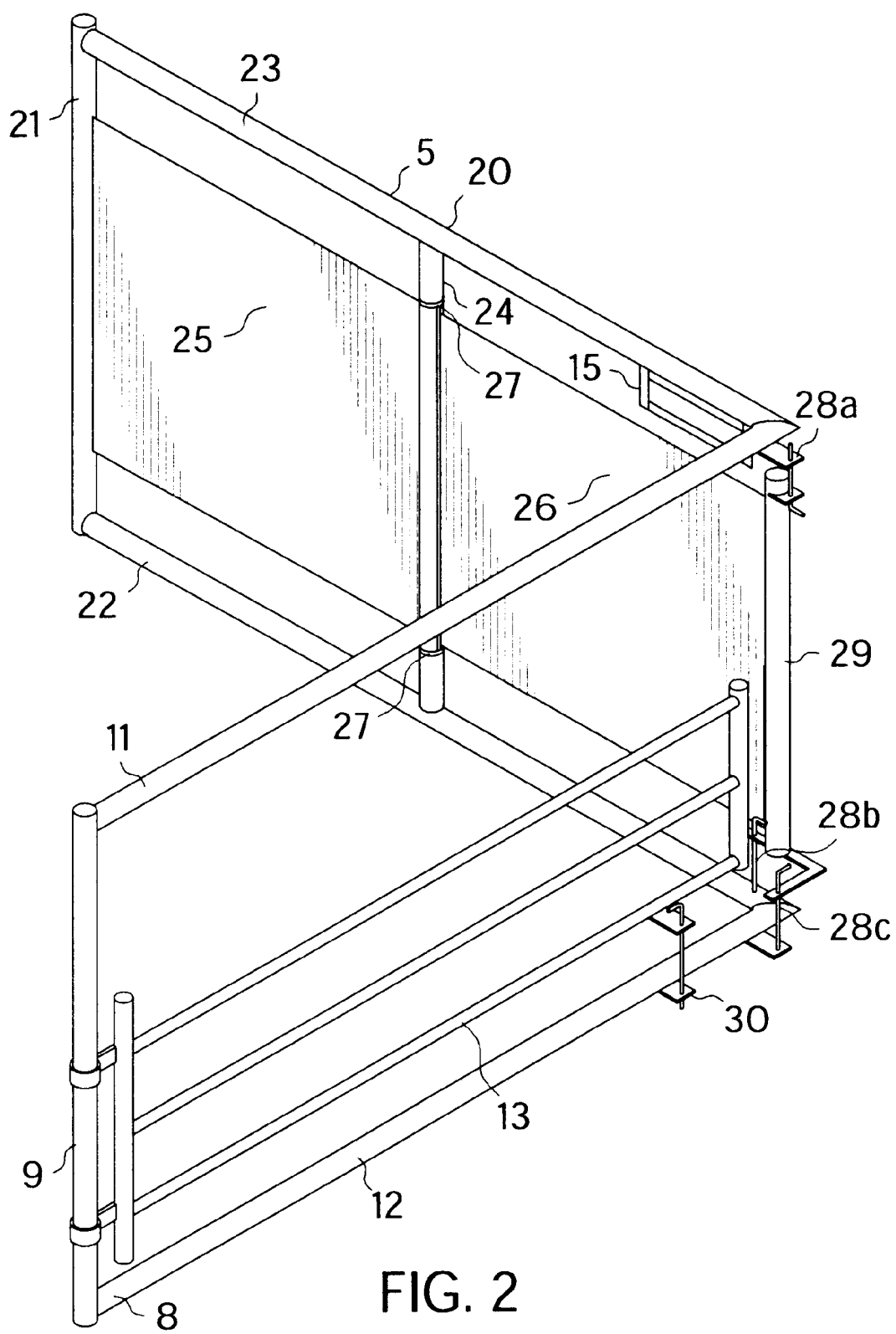
FIG. 2 is a perspective view of the first side panel and rear frame and gate of a preferred embodiment.

FIG. 2 shows the rear frame 8, rear gate 13 and first side panel 5 of one preferred embodiment of the invention. The remainder of the pen is the same as the prior art pen of FIG. 1 and, for clarity, is not shown. The first side panel 5 is a two part panel mounted in a first side panel frame 20 consisting of a front side vertical member 21, which is attached to the first end 3 of the front panel 1, a bottom side horizontal member 22, a top side horizontal member 23 and an intermediate side vertical member 24 attached between the bottom and top side horizontal members 22, 23 at a mid point thereof. Squeeze panel latch plate 15 is attached to the top side horizontal member 23. Front side panel 25 is attached between the front and intermediate side vertical members 21, 24. Rear side panel 26 pivots about intermediate vertical member 24 on hinges 27 and is secured by any one, or a combination of more than one, of panel pin and hole locks 28a, 28b or 28c engaging the rear vertical side member 29.

The location of the intermediate side vertical member 24 is such as to provide the desired opening between it and the rear of the pen. It should be kept in mind that the farther from the rear of the pen, the weaker will be the structure as this intermediate side vertical member 24 supports the top horizontal members of the side and rear frames.

Rear frame 8 comprises a rear frame vertical member 9 attached to the rear end of the second side panel 6 and top and bottom rear horizontal members 11, 12. The vertical corner member 10 of the prior art pen is not present, as the top and bottom horizontal members 11, 12 are attached to the top and bottom side horizontal members 22, 23. Also, contrary to the prior art pen, the rear gate 13 pivots at the opposite end about the rear frame vertical member 9 and is secured in the closed position by gate pin and hole lock 30.

The embodiment thus provides a pen wherein all parts of the pen may be removed from the rear end and a rear portion of the confined animal. Rear gate 13 and rear side panel 26 may be pivoted away from the confined animal, and there is no vertical corner member 10 in the embodiment to interfere with access to the confined animal. Squeeze panel 4 may be shortened somewhat to provide access to the rear of the confined animal, as is known in the prior art.

Figure 3:
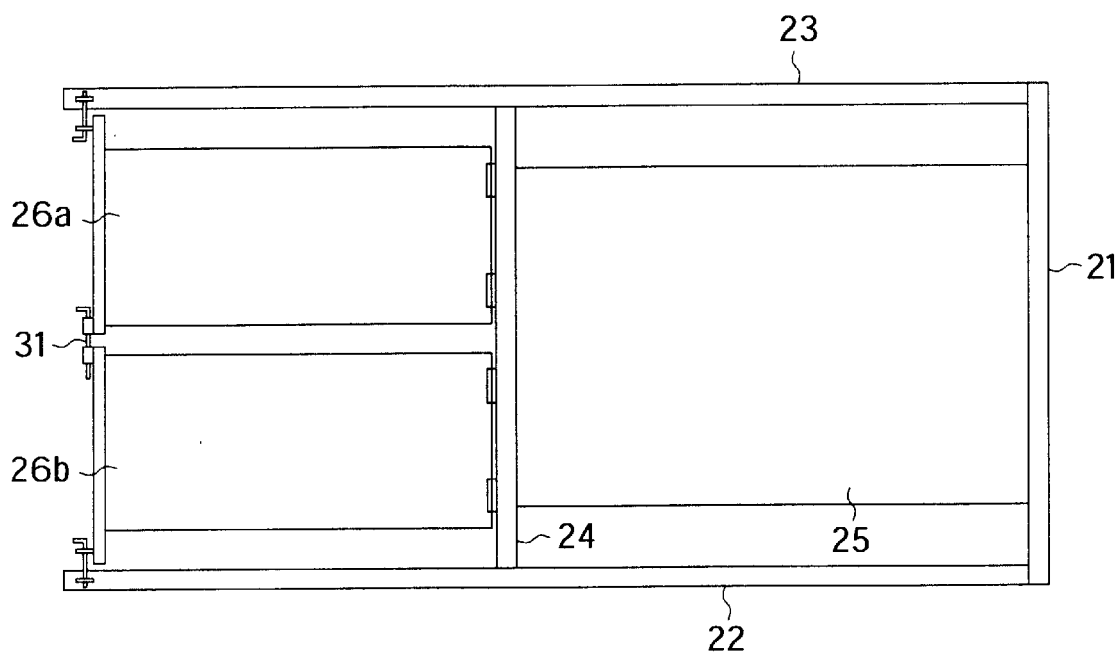
FIG. 3 is a side view of a first alternate first side panel.

FIG. 3 illustrates an alternate first side panel 5 wherein the rear side panel 26 is a two part panel consisting of an upper panel 26a and a lower panel 26b. Both hinge on the intermediate side vertical member 24. The upper and lower panels 26a, 26b may be locked together by panel lock 31, or may pivot independently.

Figure 4:
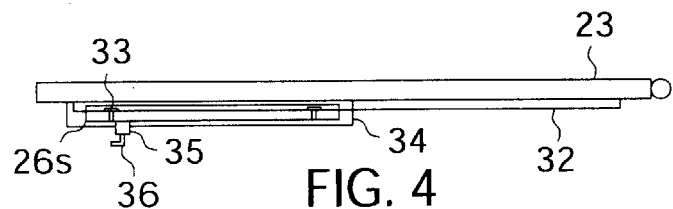
FIG. 4 is an top view of a second alternate first side panel.
Figure 5:
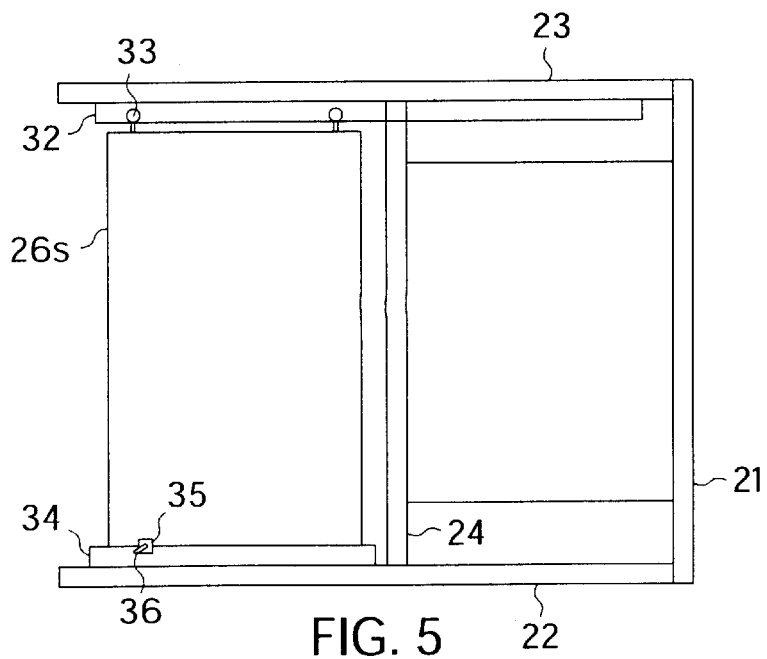
FIG. 5 is a side view of the first side panel of FIG. 4.

FIGS. 4 and 5 illustrate another alternate first side panel 5 wherein the rear side panel 26 is a sliding panel 26s mounted to panel rail 32 by panel rollers 33 and engaged in panel channel 34 attached to the bottom side horizontal member 22. Panel bracket 35 is attached to sliding panel 26s and is secured to panel channel 34 by panel pin 36.

Figure 6:
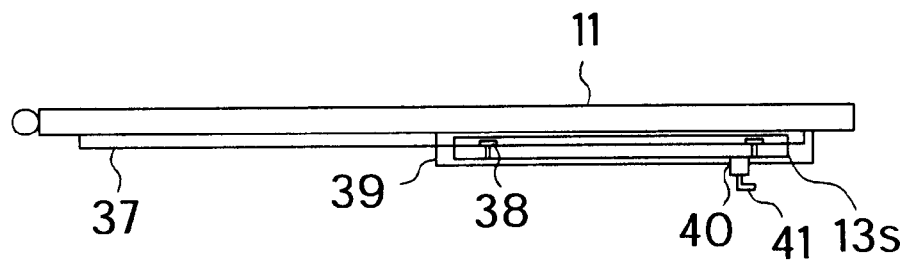
FIG. 6 is an top view of an alternate rear gate.
Figure 7:
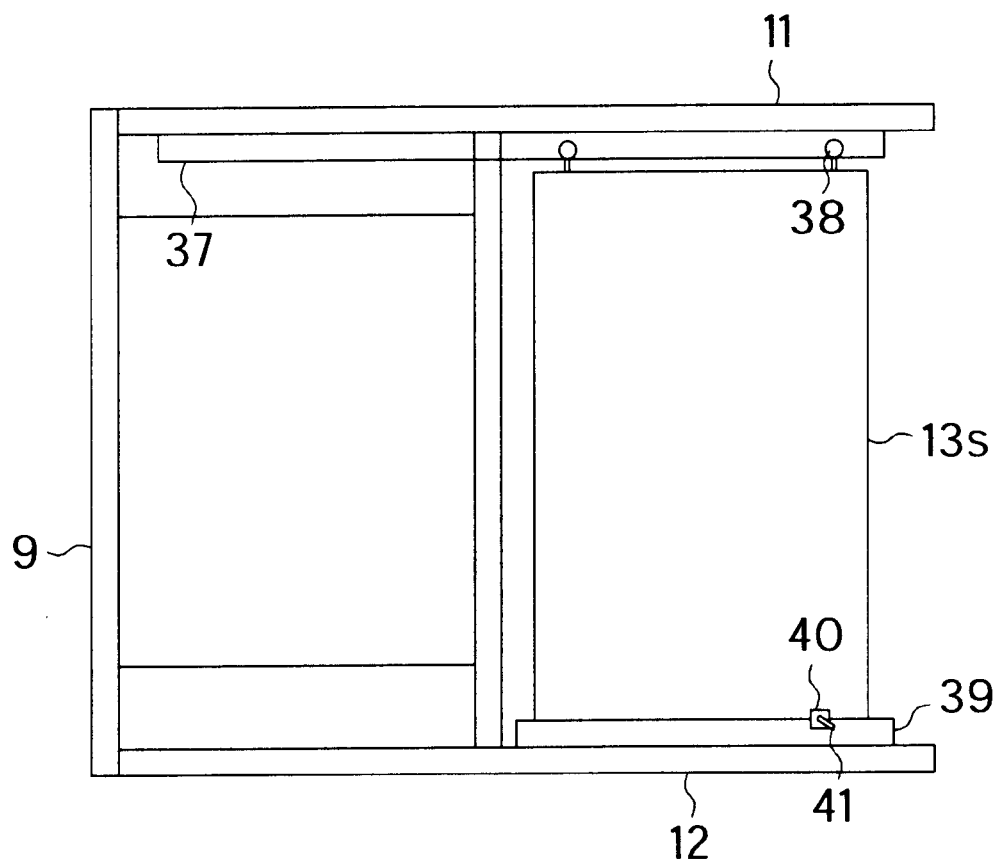
FIG. 7 is a side view of the rear gate of FIG. 6.

FIGS. 6 and 7 illustrate an alternate rear gate 13 wherein the rear gate 13 is a sliding rear gate 13s mounted to gate rail 37 by panel rollers 38 and engaged in gate channel 39 attached to the bottom rear horizontal member 12. Gate bracket 40 is attached to sliding gate 13s and is secured to gate channel 39 by gate pin 41.

Figure 8:
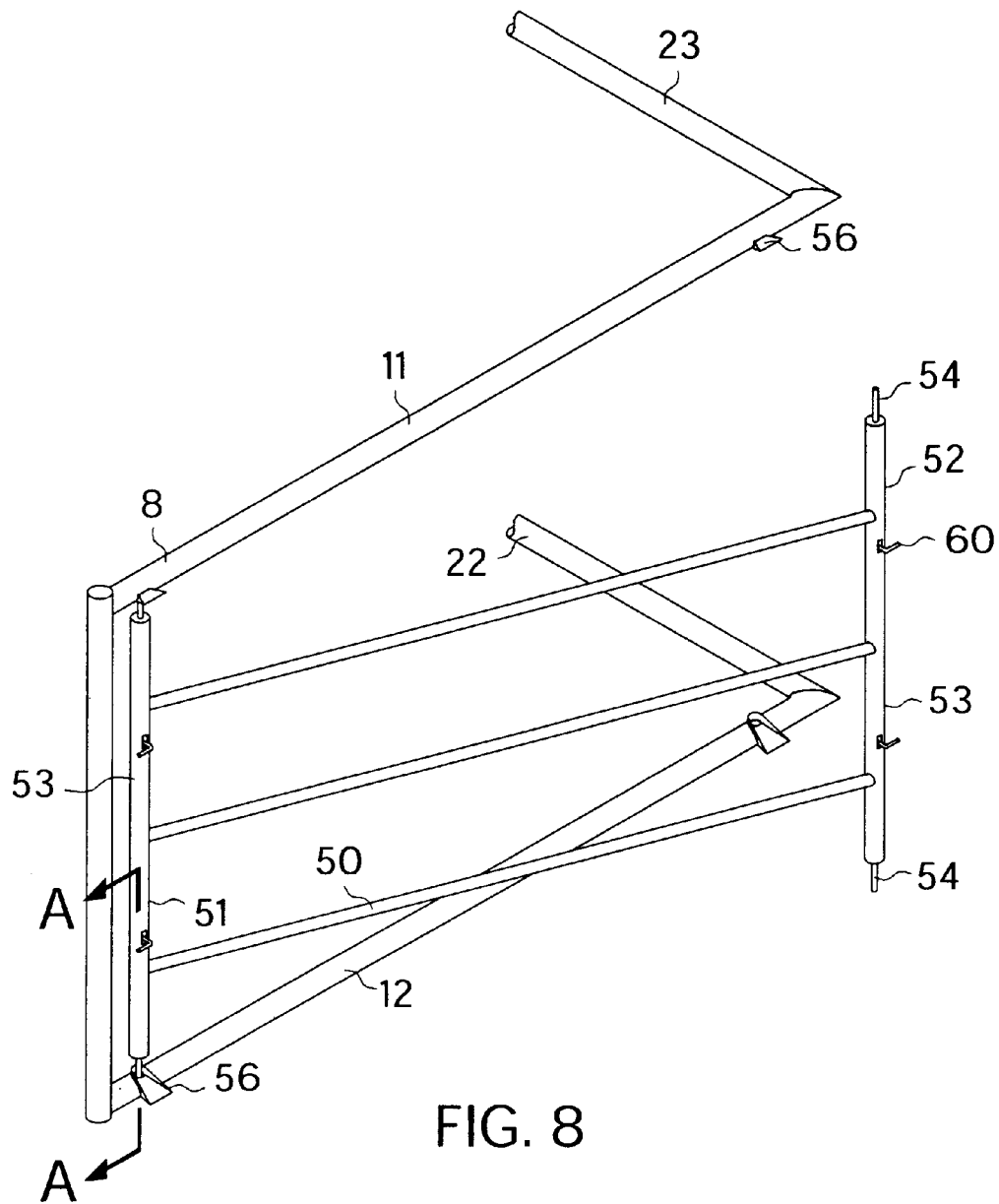
FIG. 8 is a perspective view of a two-way gate.
Figure 10:
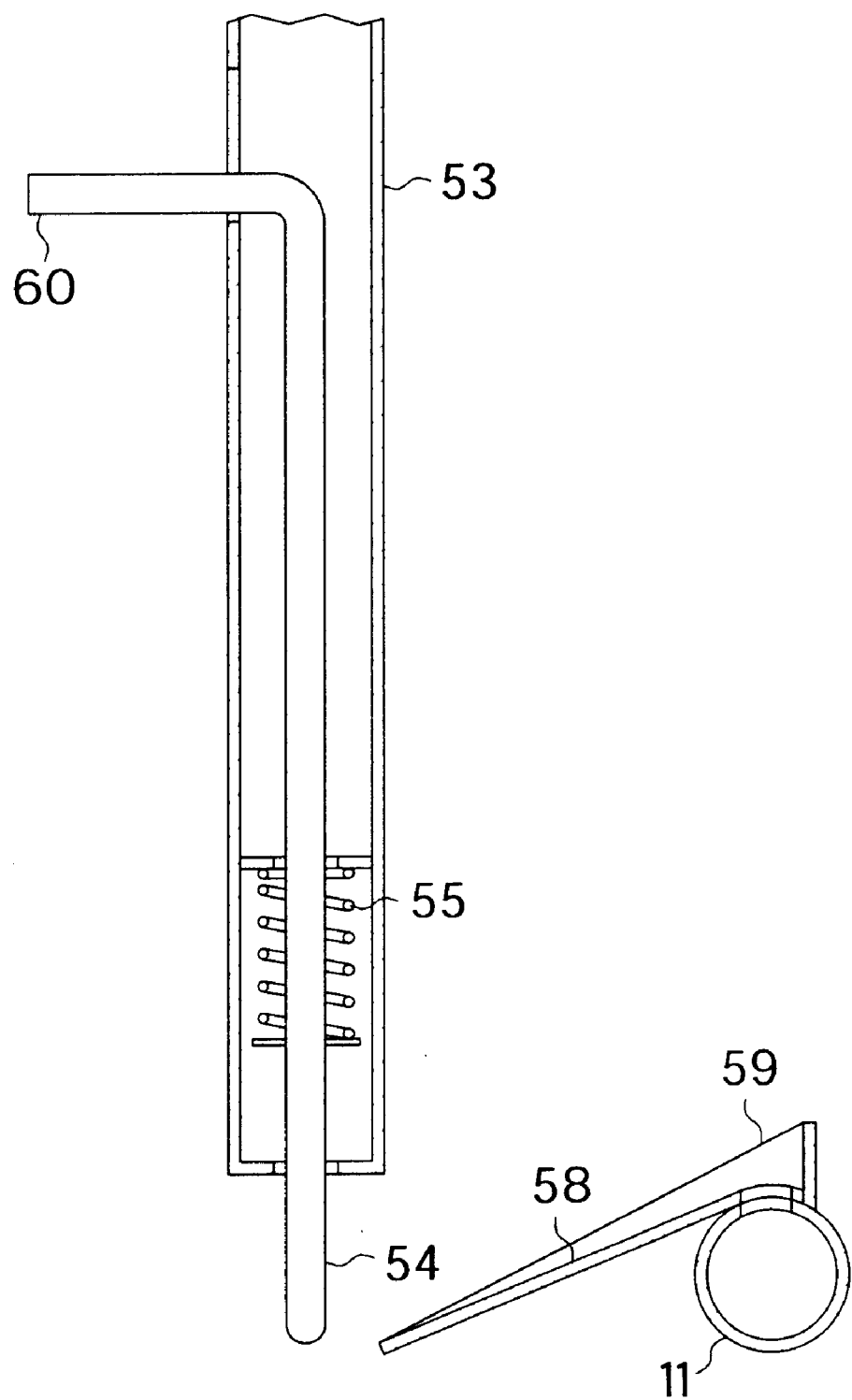
FIG. 10 is a cross-sectional view along line AA in FIG. 8.

FIG. 8 illustrates a two-way gate 50 installed on the rear frame 8. A two way gate can swing open from either end thereby providing the advantage present in prior art pens where the gate 50 may be swung open at its second end 51 and used in conjunction with the squeeze panel 4 to direct the animal diagonally across the pen and into the head gate 2. Once the animal is confined, the gate 50 may be swung open at its first end 52, thereby allowing the desired access to the animal. Any two-way gate may be used. The illustrated gate has a rear gate vertical member 53 attached to each side of the gate 50 extending substantially between said top and bottom rear horizontal members 11, 12. A gate pivot pin 54 extends from each end of the rear gate vertical members 53. The gate pivot pins 54 are biassed in an extended position by spring 55, as illustrated in FIG. 10. The gate pivot pins 54 are retractable against the biassing force of spring 55 to a retracted position wherein they are retracted within the rear gate vertical member.

Figure 9:
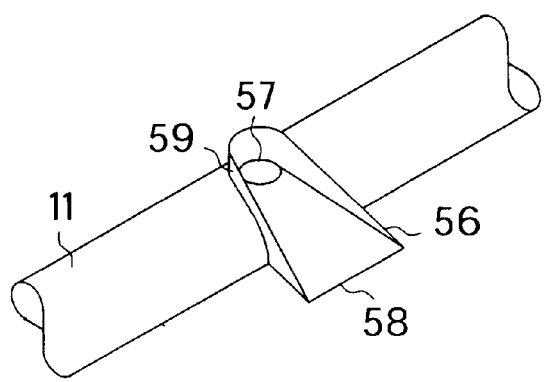
FIG. 9 is a perspective view of the pivot guide in the two-way gate of FIG. 8.

A pivot guide 56, illustrated in FIGS. 9 and 10, is mounted to the top and bottom horizontal members 11, 12 for guiding the gate pivot pins 54 into the pivot holes 57 in those members 11, 12, as the gate 50 is pushed closed, the gate pivot pin 54 contacts the slanted pivot guide bottom 58 and is pushed into the retracted position. The pivot guide walls 59 guide the gate pivot pin 54 into alignment with the pivot holes 57, at which time the biassing force of the spring 55 pushes the gate pivot pins 54 into the pivot holes 57. To open the gate 50, gate pin handles 60 are used to retract the gate pivot pins 54 from the pivot holes 57.

Operating the gate pin handles 60 at either end of the gate 50 allows the gate 50 to be opened from either end.

FIG. 11 illustrates an alternate embodiment which adds more support to the top horizontal side and rear members, and provides a more rugged pen. A rear frame extension is provided by lengthening the top and bottom horizontal members 11, 12 past the first side panel 5 and attaching a vertical extension member 70 between. The top horizontal rear and side members are now supported by this vertical extension member 70 as well as the intermediate side vertical member 24. Vertical corner member 71 is pivotally attached about vertical extension member 70 on extension rails 72 and may be secured by corner pin and hole locks 73 into a closed position between the corner formed by the top horizontal side and rear members 11, 23 and the corner formed by the bottom horizontal side and rear members 12, 22, or may be pivoted out of the way of a confined animal, thus providing the same clear area as the embodiment of FIG. 1.

FIG. 12 illustrates an embodiment similar to that of FIG. 11 except that the top and bottom horizontal side members 22, 23 are extended instead of the rear horizontal members. Otherwise the embodiment functions the same. Alternatively the extension could be oriented so that the vertical corner member 71 is located at some diagonal from the rear corner of the pen.

In either of the embodiments of FIGS. 11 or 12, the rear side panel 26 may conveniently be latched to the vertical corner member 71 instead of to a top or bottom horizontal member.

Figure 13:
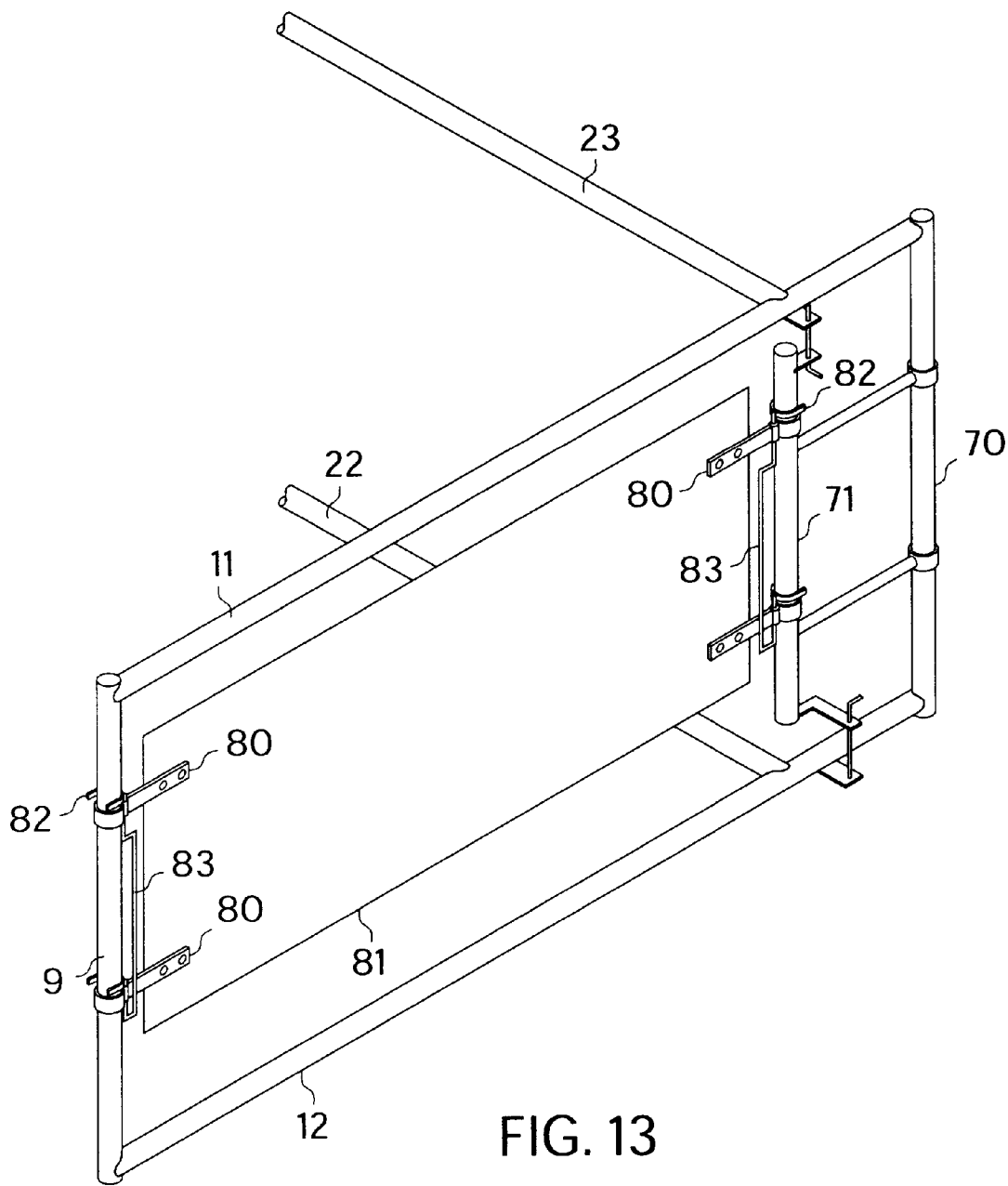
FIG. 13 is a perspective view of a two-way gate for use with the embodiment of FIGS. 11 or 12.

The embodiments of FIGS. 11 or 12 provide a vertical member at each rear corner which would be suitable for attachment of various two-way gates. The two-way gate disclosed in the above mentioned co-pending application would be suitable and is illustrated in FIG. 13. Details are provided in the co-pending application, and it is sufficient for this application to say that U-shaped hinge members 80 are fixed to the gate panel 81 and engage the rear frame vertical member 9 and vertical corner member 71. The hinge members 80 are locked into engagement with the vertical members 9, 71 by the U-shaped latch members 82. Operation of the latch bar 83 releases the latch members 82 on either one end or the other so that the gate will swing open and pivot on that end where the latch members 82 remain in the locking position. The embodiment of FIG. 13 provides a strong and rugged pen suitable for rough treatment.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An animal confinement pen comprising:
   a front panel, a rear panel comprising a rear gate, a first side panel comprising a fixed front side panel and a movable rear side panel, and a second side panel;
   means to confine an animal against said first side panel with the animal's head extending through a head gate incorporated in said front panel,
   means to lock said rear side panel into substantial alignment with said front side panel adjacent said confined animal and to release said rear side panel allowing same to move away from the rear portion of said confined animal;
   means to move said rear gate away from the rear end of said confined animal;
   whereby all parts of said pen may be moved away from said rear end and a rear portion of said confined animal thereby allowing access thereto by the pen operator.

2. The invention of claim 1 wherein:
   the first side panel further comprises:
      a first side panel frame comprising:
         a front side vertical member attached to a first end of said front panel;
         a bottom side horizontal member attached to the bottom of said front side vertical member and extending to the rear of said pen;
         a top side horizontal member attached to the top of said front side vertical member and extending to the rear of said pen; and
         an intermediate side vertical member attached between said top and bottom side horizontal members at a mid point thereof;
      wherein the front side panel is attached between said front and intermediate side vertical members and between said top and bottom side horizontal members; and the rear side panel is movably mounted in said first side panel frame between said top and bottom side horizontal members such that said rear side panel may be moved from a closed position adjacent to said confined animal to an open position removed from said confined animal;
   the second side panel having a front end and being attached at the front end thereof to the second end of said front panel and extending substantially perpendicular thereto to the rear of said pen;

the rear panel further comprising:
a rear frame comprising:
a rear frame vertical member attached to the rear end of said second side panel;
a bottom rear horizontal member attached at one end to the bottom of said rear frame vertical member and attached at the opposite end to the rear end of said bottom side horizontal member;
a top rear horizontal member attached at one end to the top of said rear frame vertical member and attached at the opposite end to the rear end of said top side horizontal member;
the rear gate being movably mounted in said rear frame between said top and bottom rear horizontal members such that said gate may be moved from a closed position adjacent to the rear end of said confined animal to an open position removed therefrom;
and wherein the invention further comprises:
a first latch to selectively secure said rear side panel in said closed position and release same to move to said open position; and
a second latch to selectively secure said rear gate in said closed position and release same to move to said open position.

3. The invention of claim 2 wherein said rear side panel is pivotally attached at its front end about a vertical axis to said intermediate vertical member such that said rear side panel may pivot about said vertical axis from a closed position aligned with said first side panel frame and adjacent to said confined animal, to an open position removed from said confined animal.

4. The invention of claim 3 wherein said rear side panel comprises an upper panel and a lower panel, each pivotally attached to said intermediate vertical member such that said panels may be selectively locked in alignment with said upper panel above said lower panel, or unlocked so that each may pivot independently.

5. The invention of claim 3 wherein said rear gate is pivotally attached about a vertical axis at its second end, being that end nearest said second side panel, to said rear frame such that said rear gate may pivot from a closed position in line with said rear frame to an open position.

6. The invention of claim 5 wherein said means to selectively secure said rear side panel comprises a rear vertical side member attached to the rear end of said rear side panel, said rear vertical side member extending substantially between said top and bottom side horizontal members and latchable to at least one of said top and bottom side and rear horizontal members.

7. The invention of claim 2 wherein said rear gate is pivotally attached about a vertical axis at its second end, being that end nearest said second side panel, to said rear frame such that said rear gate may pivot from a closed position aligned with said rear frame to an open position.

8. The invention of claim 7 wherein said rear gate is a two-way gate wherein said gate is pivotally attached about a vertical axis at its first end, being that end opposite said second end, to said rear frame and latchable at its second end to said rear frame whereby either end of said gate may swing open.

9. The invention of claim 8 wherein said rear gate comprises a rear gate vertical member attached to said rear gate, said rear gate vertical member extending substantially between said top and bottom rear horizontal members; a gate pivot pin extending from each end of said rear gate vertical member, said gate pivot pins biassed in an extended position and retractable against said biassing force to a retracted position wherein said gate pivot pins are retracted within said rear gate vertical member; a pivot hole defined by each of said top and bottom rear horizontal members for receiving said gate pivot pins; and means for retracting said gate pivot pins.

10. The invention of claim 9 further comprising a pin guide at each said pivot hole for guiding said pin into said hole, said pin guide comprising a slanted portion operable to push said gate pivot pins into a retracted position when said rear gate is push ed closed, said pin extending in response to said biassing force when aligned with said pivot hole.

11. The invention of claim 2 wherein said r ear side panel is slidingly attached to said first side panel frame such that said rear side panel may slide from a closed position, adjacent to said confined animal between said intermediate vertical member and said rear frame, to an open position adjacent to said front side panel and substantially between said intermediate vertical member and said front side vertical member.

12. The invention of claim 11 wherein said means to selectively secure said rear first side panel comprises a latch engaging said rear first side panel and one of said first side panel frame and said rear frame.

13. The invention of claim 2 wherein said rear gate comprises a fixed rear panel attached to said rear frame adjacent to said rear frame vertical member and a rear gate slidingly attached to said rear frame such that said rear gate may slide from a closed position, adjacent to the rear end of said confined animal, to an open position adjacent to said fixed rear panel.

14. An animal confinement pen comprising:
a front panel having a first end and a second end and incorporating a head gate adjacent said first end thereof;
a first side panel frame comprising a front side vertical member attached to said first end of the front panel; a top side horizontal member attached at the front end thereof to the top of said front side vertical member and a bottom side horizontal member attached at the front end thereof to the bottom of said front side vertical member, said top and bottom side horizontal members extending to the rear of the pen, substantially perpendicular to said front panel; and an intermediate side vertical member attached at its top end to said top side horizontal member and at its bottom end to said bottom side horizontal member at a midpoint of said horizontal members;
a front side panel attached to said first side panel frame between said front and intermediate side vertical members and between said top and bottom side horizontal members;
a rear side panel pivotally attached about a vertical axis at its front end to said intermediate side vertical member such that said rear first side panel may pivot from a closed position in alignment with said first side panel frame and adjacent to an animal confined by said squeeze panel, to an open position removed therefrom;
a squeeze panel pivotally attached about a vertical axis to a mid-point of said front panel adjacent to said head gate such that said squeeze panel may be pivoted from a closed position, wherein said squeeze panel is substantially perpendicular to said front panel and acts in that position to confine an animal between said squeeze panel and a first side panel, to an open position removed from said animal;
a second side panel attached to said second end of the front panel and extending towards the rear of said pen, substantially perpendicular to said front panel;

a rear frame comprising a rear frame vertical member attached to the rear end of said second side panel; a top rear horizontal member attached at one end thereof to the top of said rear frame vertical member and a bottom rear horizontal member attached at one end thereof to the bottom of said rear frame vertical member, said top and bottom rear horizontal members extending substantially perpendicular to said second side panel and attached at the opposite ends thereof to the rear ends of said top and bottom first side horizontal members respectively to form a top rear corner and a bottom rear corner;

a frame extension comprising a top frame extension member attached to said top rear corner and extending therefrom such that the outside end thereof is outside the pen; a bottom frame extension member attached to said bottom rear corner and extending therefrom such that the outside end thereof is substantially vertically below said outside end of the top frame extension member; a vertical extension member attached between said outside ends of the top and bottom frame extension members;

a vertical corner member pivotally attached about a vertical axis to said vertical extension member such that said vertical corner member may pivot from a closed position, wherein said vertical corner member is aligned with said top and bottom rear corners, to an open position wherein said vertical corner member is removed from said corners;

a first latch to selectively secure said rear side panel in said closed position or release same;

a second latch to selectively secure said vertical corner member in said closed position or release same;

a rear panel comprising a rear gate pivotally attached about a vertical axis at its second end, being that end nearest said second side panel, to said rear frame and latchable at its first end to said vertical corner member.

15. The invention of claim 14 wherein said top and bottom frame extension members are aligned with said top and bottom rear horizontal members.

16. The invention of claim 15 wherein said top frame extension member and said top rear horizontal member are formed from a single member and wherein said bottom frame extension member and said bottom rear horizontal member are formed from a single member.

17. The invention of claim 14 wherein said top and bottom frame extension members are aligned with said top and bottom side horizontal members.

18. The invention of claim 17 wherein said top frame extension member and said top side horizontal member are formed from a single member and wherein said bottom frame extension member and said bottom side horizontal member are formed from a single member.

19. The invention of claim 14 wherein said rear gate is a two-way gate pivotally attached about a vertical axis at its first end to said vertical corner member and latchable at its second end to said rear frame vertical member and as well pivotally attached about a vertical axis at its second end to said rear frame vertical member and latchable at its first end to said vertical corner member, whereby either end of said two-way gate may be opened.

* * * * *